United States Patent
Kang et al.

(10) Patent No.: US 9,139,191 B2
(45) Date of Patent: Sep. 22, 2015

(54) OIL PUMP CONTROL METHOD FOR HYBRID VEHICLE

(75) Inventors: Seung Jae Kang, Seoul (KR); Jong Hyun Kim, Suwon-si (KR); Young Chul Kim, Gwangmyeong-si (KR); Jang Mi Lee, Tongyeong-si (KR)

(73) Assignees: HYUNDAI MOTOR COMPANY, Seoul (KR); KIA MOTORS CORP., Seoul (KR)

( * ) Notice: Subject to any disclaimer, the term of this patent is extended or adjusted under 35 U.S.C. 154(b) by 465 days.

(21) Appl. No.: 13/493,562

(22) Filed: Jun. 11, 2012

(65) Prior Publication Data

US 2013/0138311 A1 May 30, 2013

(30) Foreign Application Priority Data

Nov. 30, 2011 (KR) .......................... 10-2011-0126462

(51) Int. Cl.
*G05D 16/00* (2006.01)
*B60W 10/11* (2012.01)
*B60W 10/30* (2006.01)
*B60W 20/00* (2006.01)
*F16H 61/00* (2006.01)
*F16H 61/04* (2006.01)

(52) U.S. Cl.
CPC ............... *B60W 10/11* (2013.01); *B60W 10/30* (2013.01); *B60W 20/00* (2013.01); *F16H 61/0031* (2013.01); *B60W 2540/16* (2013.01); *F16H 2061/0488* (2013.01)

(58) Field of Classification Search
None
See application file for complete search history.

(56) References Cited

U.S. PATENT DOCUMENTS 6,110,072 A * 8/2000 Harada et al. ................. 477/157

FOREIGN PATENT DOCUMENTS

| JP | 2006-105317 A | 4/2006 |
| JP | 2006105272 A | 4/2006 |
| JP | 2007196757 A | 8/2007 |
| KR | 10-2009-0043123 A | 5/2009 |
| KR | 10-1241210 B1 | 3/2013 |

* cited by examiner

*Primary Examiner* — Mussa A Shaawat
*Assistant Examiner* — Abdhesh Jha
(74) *Attorney, Agent, or Firm* — Morgan, Lewis & Bockius LLP

(57) ABSTRACT

Noise may be prevented from being generated while providing smooth shift operability by preventing the overshoot phenomenon in which rpm of the electric oil pump is unexpectedly increased as the load decreases at the time when shifting ends in controlling the rpm of the electric oil pump to increase in order to increase the line pressure of the transmission as the shifting operation from step N to step D is performed in the hybrid vehicle having the electric oil pump.

2 Claims, 4 Drawing Sheets

OIL PUMP CONTROL METHOD FOR HYBRID VEHICLE

CROSS-REFERENCE TO RELATED APPLICATION

The present application claims priority of Korean Patent Application Number 10-2011-0126462 filed Nov. 30, 2011, the entire contents of which application is incorporated herein for all purposes by this reference.

BACKGROUND OF INVENTION

1. Field of Invention

The present invention relates to an oil pump control method for a hybrid vehicle, and more particularly, to a technology configured to reduce operation noise of an electric oil pump.

2. Description of Related Art

An electric oil pump is additionally provided in a hybrid vehicle in addition to a mechanical oil pump to operate supplementarily when the mechanical oil pump cannot supply a sufficient oil flow to a transmission in an idle state or EV mode driving.

In operating the electric oil pump, when a driver switches a shift lever from step N to step D while stepping a brake, a pump controller controls rpm of the electric oil pump to increase in order to form line pressure required for shifting as shown in FIG. 1 and thereafter, when the shifting from step N to step D ends to decrease the required line pressure, the pump controller sends a command to decrease the rpm to the electric oil pump.

However, in the above case, as a load of the electric oil pump is decreased by the line pressure which decreases instantaneously, the electric oil pump rotates rapidly like a part marked with A and thereafter, the speed of the electric oil pump is decreased by the command of the pump controller in the end.

As described above, at the time when the shifting ends, as the load decreases, an overshoot phenomenon in which the rpm of the electric oil pump increases unexpectedly causes noise.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an oil pump control method of a hybrid vehicle configured to prevent noise from being generated while providing smooth shift operability by preventing an overshoot phenomenon in which rpm of an electric oil pump is unexpectedly increased as a load decreases at the time when shifting ends in controlling the rpm of the electric oil pump to increase in order to increase line pressure of a transmission as a shifting operation from step N to step D is performed in the hybrid vehicle having the electric oil pump.

Various aspects of the present invention provide for an oil pump control method of a hybrid vehicle, including a shifting operation judging process of judging whether a driver operates a shift lever from step N to step D, an elapsed time judging process of judging whether a predetermined time elapsed after the N-D shifting operation, and a rpm reducing process of reducing rpm of an electric oil pump when the predetermined time elapsed as a result of performing the elapsed time judging process.

Various aspects of the present invention provide for an oil pump control method of a hybrid vehicle in which line pressure is increased by increasing the rpm of the electric oil pump according to a line pressure control signal for increasing line pressure of a transmission, which is generated when a driver switches a shift lever from step N to step D while stepping a brake pedal, however, the line pressure control signal is disregarded and the rpm of the electric oil pump is gradually decreased in advance before the line pressure control signal decreases the line pressure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
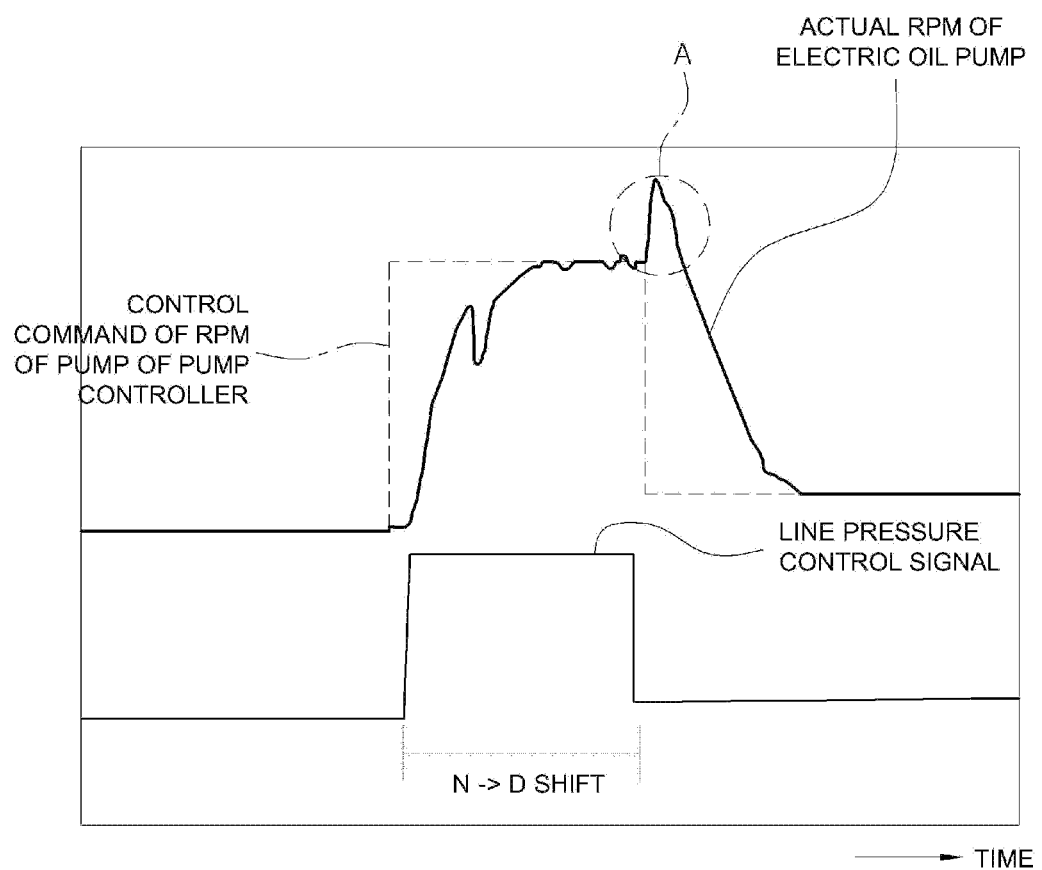
FIG. 1 is a diagram showing an overshoot phenomenon of an electric oil pump in the related art.

It should be understood that the appended drawings are not necessarily to scale, presenting a somewhat simplified representation of various features illustrative of the basic principles of the invention.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
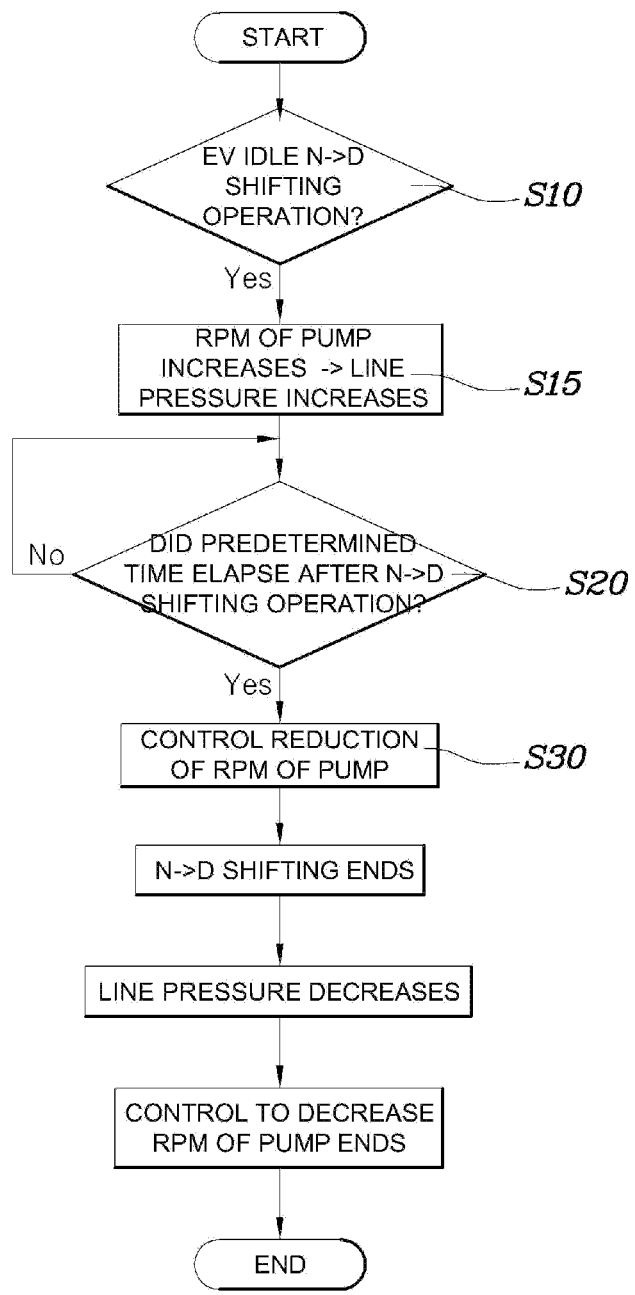
FIG. 2 is a flowchart of an exemplary oil pump control method of a hybrid vehicle according to the present invention.
Figure 3:
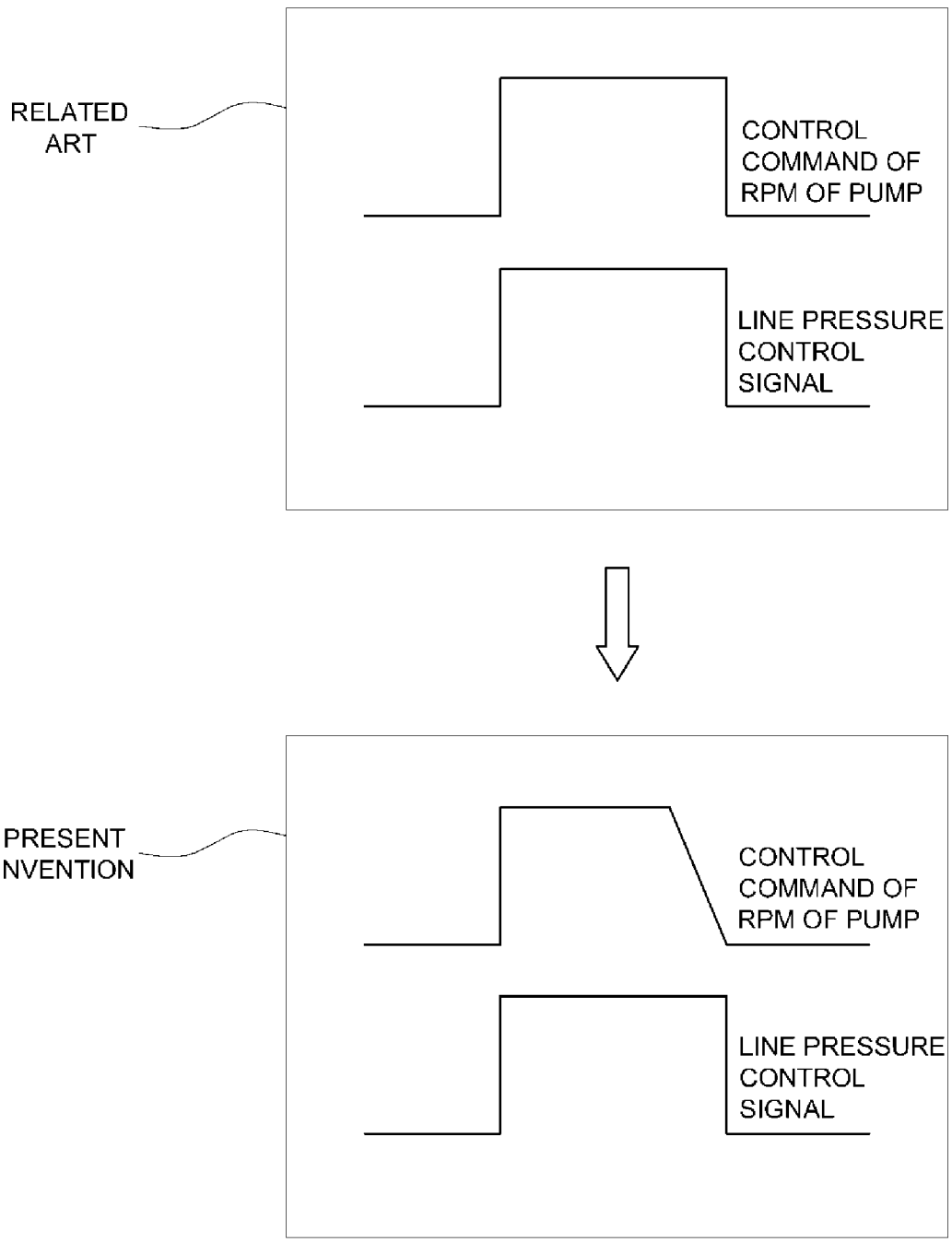
FIG. 3 is a diagram describing an exemplary control method according to the present invention as compared with the related art.

Referring to FIG. 2, an oil pump control method of a hybrid vehicle according to various embodiments of the present invention includes a shifting operation judging process (S10) of judging whether a driver operates a shift lever from step N to step D, an elapsed time judging process (S20) of judging whether a predetermined time elapsed after the N-D shifting operation, and a rpm reducing process (S30) of reducing rpm of an electric oil pump when the predetermined time elapsed as a result of performing the elapsed time judging process (S20).

That is, line pressure is increased by increasing the rpm of the electric oil pump according to a line pressure control signal for increasing line pressure of a transmission, which is generated when a driver switches a shift lever from step N to step D while stepping a brake pedal, however, the line pressure control signal is disregarded and the rpm of the electric oil pump is gradually decreased in advance before the line pressure control signal decreases the line pressure to prevent the rpm of the electric oil pump from being decreased unexpectedly due to the decrease of a load as required line pressure decreases, thereby preventing noise from being generated.

Figure 4:
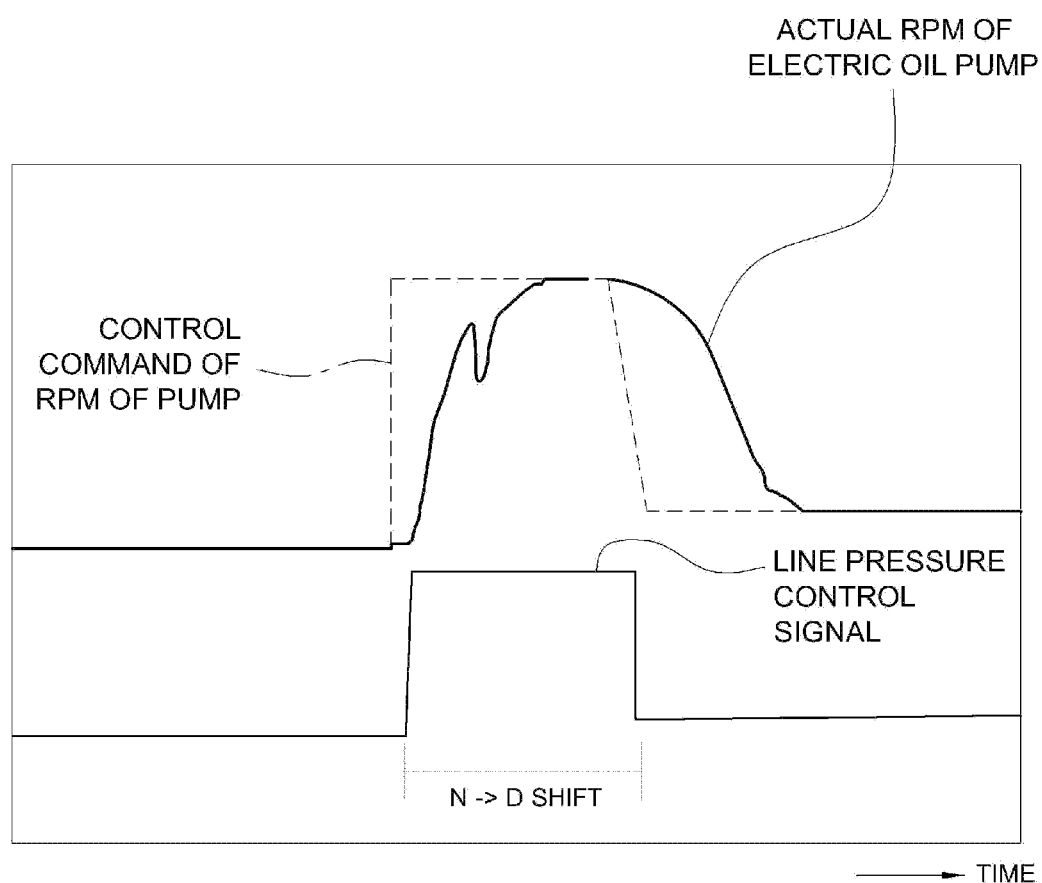
FIG. 4 is a diagram describing an effect by an exemplary oil pump control method of the hybrid vehicle according to the present invention.

As a result of performing the shifting operation judging process (S10), when it is judged that the shifting operation from step N to step D is performed, a transmission control unit (TCU) gives a command to a pump controller by generating the line pressure control signal as shown in FIG. 4 and the pump controller performs the rpm increasing process (S15) of increasing the rpm of the electric oil pump to predetermined rpm in order to increase the line pressure of the transmission to form the required line pressure.

The increased line pressure should be maintained until the shifting ends, and as a result, the increased state of the rpm of the electric oil pump is also maintained.

In this case, when the line pressure decreases according to the line pressure control signal provided by the TCU, the rpm of the electric oil pump is also decreased in the related art, but in the present invention, when it is judged that the predetermined time elapsed after the shifting is started by the elapsed time judging process (S20), the line pressure control signal is disregarded and the rpm reducing process (S30) of gradually reducing the rpm of the electric oil pump is performed as shown in the figure and thereafter, the rpm of the electric oil pump is prevented from being unexpectedly increased due to the decrease of the load.

Therefore, the predetermined time in the elapsed time judging process (S20) should be set as a time before the decrease of the line pressure is required as the N-D shifting ends and more particularly, after the line pressure control signal increases the line pressure of the transmission and thereafter, the line pressure control signal is disregarded and the rpm of the electric oil pump may be decreased linearly from a time when at least 60 to 90% elapsed in total time when the line pressure increased for the N-D shifting should be maintained.

Of course, although the predetermined time will be determined through several tests and analyses, when the time is too short as 60% and less, the line pressure decreases before the shifting ends, and as a result, a problem may occur in the shifting operation and when the time is too long as 90% or more, the rpm of the electric oil pump may be increased due to the decrease of the load. Therefore, the meaning of the present invention may be discolored.

Meanwhile, in the rpm reducing process (S30), the rpm of the electric oil pump is gradually decreased from the predetermined rpm in the rpm increasing process (S15), and as a result, the predetermined rpm is the rpm of the electric oil pump set to be required when the line pressure is increased by the line pressure control signal from the TCU.

As described above, the line pressure control signal is generated by the TCU and the pump controller controls the electric oil pump by using the signal, but since the TCU may also serve to perform the function of the pump controller and an additional controller may be configured to serve to perform the function, the present invention is not limited to a type of the controller and a type of the control.

According to the present invention, the smooth shifting operation can be performed due to the increase in the rpm of the electric oil pump in the N-D shifting and the noise caused by the overshoot of the electric oil pump can be prevented, and as a result, merchantability of the vehicle can be improved through improvement of NVH performance.

According to various embodiments of the present invention, noise is prevented from being generated while providing smooth shift operability by preventing the overshoot phenomenon in which rpm of the electric oil pump is unexpectedly increased as the load decreases at the time when shifting ends in controlling the rpm of the electric oil pump to increase in order to increase the line pressure of the transmission as the shifting operation from step N to step D is performed in the hybrid vehicle having the electric oil pump.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An oil pump control method of a hybrid vehicle, comprising:
    a shifting operation judging process of judging, by a controller, whether a driver operates a shift lever from neutral N to drive D in a N-D shifting operation;
    an elapsed time judging process of judging, by the controller, whether a predetermined time elapsed after the N-D shifting operation; and
    a rpm reducing process of reducing rpm of an electric oil pump, by the controller, when the controller determines that the predetermined time elapsed as a result of performing the elapsed time judging process,
    wherein the predetermined time in the elapsed time judging process is set as a time before the decrease of the line pressure is required when the controller determines that the N-D shifting ends.

2. The oil pump control method of a hybrid vehicle of claim 1, wherein:
    as a result of performing the shifting operation judging process, when it is judged that the shifting operation from neutral N to drive D is performed, an rpm increasing process of increasing the rpm of the electric oil pump to predetermined rpm in order to increase the line pressure of the transmission is performed, and in the rpm reducing process, the rpm of the electric oil pump is gradually decreased from the predetermined rpm in the rpm increasing process.

\* \* \* \* \*